(12) United States Patent
Merlot

(10) Patent No.: US 9,541,002 B2
(45) Date of Patent: Jan. 10, 2017

(54) TURBINE ENGINE COWL CAPABLE OF COVERING A FAN CONE

(71) Applicant: SNECMA, Paris (FR)

(72) Inventor: Damien Merlot, Vaux le Penil (FR)

(73) Assignee: SNECMA, Paris (FR)

( * ) Notice: Subject to any disclaimer, the term of this patent is extended or adjusted under 35 U.S.C. 154(b) by 34 days.

(21) Appl. No.: 14/648,102

(22) PCT Filed: Nov. 14, 2013

(86) PCT No.: PCT/FR2013/052738
§ 371 (c)(1),
(2) Date: May 28, 2015

(87) PCT Pub. No.: WO2014/083256
PCT Pub. Date: Jun. 5, 2014

(65) Prior Publication Data
US 2015/0267614 A1     Sep. 24, 2015

(30) Foreign Application Priority Data
Nov. 29, 2012    (FR) ...................................... 12 61416

(51) Int. Cl.
*F02C 7/04*     (2006.01)
*F02K 3/06*     (2006.01)

(52) U.S. Cl.
CPC . *F02C 7/04* (2013.01); *F02K 3/06* (2013.01); *F05D 2220/36* (2013.01); *F05D 2260/33* (2013.01)

(58) Field of Classification Search
CPC ................ F02C 7/04; F02K 3/04; F02K 3/02; F02K 3/06; F05D 2220/36; F05D 2260/33
USPC ...................................................... 415/218.1
See application file for complete search history.

(56) References Cited

U.S. PATENT DOCUMENTS

| | | | | |
|---|---|---|---|---|
| 4,863,354 A | * | 9/1989 | Asselin | B64C 11/14 415/175 |
| 5,833,435 A | * | 11/1998 | Smith | F02C 7/04 156/153 |
| 7,971,827 B2 | * | 7/2011 | Barrientos | B64D 33/02 244/121 |
| 2004/0195437 A1 | * | 10/2004 | Garric | B64F 1/005 244/53 B |

(Continued)

FOREIGN PATENT DOCUMENTS

| | | |
|---|---|---|
| EP | 0311514 | 4/1989 |
| FR | 2168938 | 9/1973 |

(Continued)

OTHER PUBLICATIONS

International Search Report as issued in International Patent Application No. PCT/FR2013/052738, dated Feb. 3, 2014.

(Continued)

*Primary Examiner* — Craig Kim
*Assistant Examiner* — Michael Sehn
(74) *Attorney, Agent, or Firm* — Pillsbury Winthrop Shaw Pittman LLP

(57) ABSTRACT

A turbine engine cowl capable of covering a fan cone, the cowl including attachment components configured to engage with connection components of the cone in order to maintain the cowl and the cone secured to one another.

10 Claims, 7 Drawing Sheets

(56) References Cited

U.S. PATENT DOCUMENTS

| | | | | |
|---|---|---|---|---|
| 2008/0022524 A1* | 1/2008 | Schreiber | ............... | B29C 70/32 |
| | | | | 29/889.21 |
| 2010/0051112 A1* | 3/2010 | Dieling | .................... | F02C 7/04 |
| | | | | 137/15.1 |
| 2010/0287908 A1* | 11/2010 | Cunningham | ......... | B64D 33/02 |
| | | | | 60/39.092 |
| 2011/0236217 A1* | 9/2011 | Bottome | .............. | F04D 29/321 |
| | | | | 416/245 R |
| 2013/0255277 A1* | 10/2013 | Macchia | ................... | F02C 7/04 |
| | | | | 60/805 |

FOREIGN PATENT DOCUMENTS

| | | |
|---|---|---|
| GB | 1 357 712 | 6/1974 |
| GB | 2 046 843 | 11/1980 |

OTHER PUBLICATIONS

International Preliminary Report on Patentability and the Written Opinion of the International Searching Authority as issued in International Patent Application No. PCT/FR2013/052738, dated Jun. 2, 2015.

* cited by examiner

TURBINE ENGINE COWL CAPABLE OF COVERING A FAN CONE

CROSS REFERENCE TO RELATED APPLICATIONS

This application is the U.S. National Stage of PCT/FR2013/052738, filed Nov. 14, 2013, which in turn claims priority to French Patent Application No. 1261416 filed Nov. 29, 2012, the entire contents of all applications are incorporated herein by reference in their entireties.

TECHNICAL FIELD OF THE INVENTION

This invention relates to the field of turbine engines and more particularly turbine engines for aircraft, preferably of the turbofan type. More specifically, the invention relates to a turbojet fan cone.

TECHNOLOGICAL BACKGROUND OF THE INVENTION

A turbojet comprises an air inlet at its upstream side supplying a fan and a compressor, the blades of which are supported on disks fixed to a shaft that extends over most of the turbojet, and that is driven in rotation by a turbine of the turbojet. Note that the terms "upstream" and "downstream" should be considered relative to a general direction of fluid flow through the turbojet, from the upstream side to the downstream side.

An intake cone is mounted at the upstream end of this shaft to deflect part of the air flow that enters inside the turbojet towards the fan blades, this flow then being separated into a core engine flow that flows into an inlet orifice to the compressor, and a fan flow that flows around the compressor and that is then mixed with the core engine flow and/or supplies turbojet component cooling circuits.

FIG. 1 diagrammatically shows such an intake cone 10. The axial attachment of the intake cone 10 on the shaft is generally made using screws inserted in attachment holes 11 located on the cone 10, for example there may be five of these holes. The cone 10 also comprises disassembly holes 12, conventionally there are three of these holes, for progressive extraction of the cone 10 along the axial direction.

Furthermore, the cone may perform a balancing function of the turbojet. The cone 10 is then provided with a plurality of holes for balancing screws 13 at a circumferential spacing from each other. For example, there may for example be twenty radial holes 13 provided on the cone, one for each fan blade. The turbojet can be balanced if the weights of the balancing screws are chosen judiciously.

The attachment holes 11, the disassembly holes 12 and the holes for the balancing screws 13 are all geometric discontinuities responsible for flow disturbances on the upstream side of the fan, and degrade the aerodynamics of the system.

GENERAL DESCRIPTION OF THE INVENTION

The purpose of the invention is to provide a solution to the problems mentioned above by disclosing a solution capable of eliminating these aerodynamic disturbances.

Therefore the invention essentially relates to a turbine engine cowl adapted to cover a fan cone, comprising attachment means capable of engaging with connection means of said cone in order to keep said cowl and said cone secured to each other.

With the invention, the holes in the cone are covered by the cowl. Geometric discontinuities responsible for aerodynamics disturbances are thus eliminated.

Apart from the characteristics mentioned in the above paragraph, the cowl according to the invention may have one or several complementary characteristics among the following, considered either individually or in any technically possible combination:
- it has an inner surface complementary to the outer surface of the cone. This limits the overall size due to the cowl.
- it has an approximately uniform outer surface. Approximately uniform means a fairly smooth surface with no macroscopic geometric discontinuities. Thus, air flows aerodynamically over the cowl.
- the attachment means comprise:
    - a plurality of teeth arranged at the bottom of the cowl, said teeth being adapted to engage into notches in the cone;
    - a plurality of projecting parts projecting from teeth, and adapted to slide in grooves in the cone opening up in said notches.

Thus, the cowl is axially inserted onto the cone by translation along the axis of revolution of the cone, the teeth engaging into the notches. Once translation is terminated, the cowl or the cone is rotated about the axis of revolution of the cone, with the projecting parts sliding in the grooves. This prevents the cowl from separating from the cone under the effect of centrifugal force due to rotation of the cone.
- there are four teeth. However, three teeth are sufficient to hold the cowl in position on the cone correctly without any risk of ovalling. Four teeth enable precise guidance of the teeth into the notches during axial insertion and good attachment of the cowl, which is advantageous in the case of ingestion of birds.
- the width of one tooth is different from the width of the other teeth, for example it may be narrower. This tooth is adapted to be engaged in an appropriate width notch, said notch acting as a foolproofing notch. This prevents loss of balance of the cone after assembly or disassembly of the cowl. The other teeth advantageously have exactly the same width, which simplifies machining of the cowl.
- the retaining means comprise a screw that can be screwed onto a crimped nut of the cone, said nut being positioned at the tip of the cone. The screw helps to hold the cowl in position on the cone.

The invention also relates to a fan cone comprising connection means capable of engaging with means of attachment of a turbine engine cowl adapted to cover said cone in order to keep said cone and said cowl secured to each other.

Such a cone is designed to be covered by a cowl like that disclosed above.

Apart from the characteristics that have just been mentioned in the previous section, the cowl according to the invention may have one or several other complementary characteristics among the following considered individually or in any technically possible combination:
- the connection means comprise:
    - a plurality of notches arranged at a base of the cone, said notches being adapted to hold the teeth of the cowl;
    - a plurality of grooves opening up in the notches and designed to receive projecting parts projecting from the teeth;
- there are four notches;
- the width of one notch is not the same as the width of the other notches;

the connection means comprise a crimped nut at the tip of the cone.

The invention also relates to an assembly comprising a cowl like that disclosed above and a cone like that disclosed above.

The invention and its different applications will be better understood after reading the following description and examining the figures that accompany it.

BRIEF DESCRIPTION OF THE FIGURES

The figures are only shown for guidance and they are in no way limitative of the invention. The figures show.

DETAILED DESCRIPTION OF AT LEAST ONE EXAMPLE EMBODIMENT OF THE INVENTION

Unless specified otherwise, any one element that appears in the different figures will have a single reference.

The invention is capable of eliminating the aerodynamic disturbances to an air flow in a fan cone, said disturbances being due to geometric discontinuities on the outer surface of said cone resulting from the different holes mentioned above. This is done by placing a cowl on the cone. The cowl and the cone are both provided with means engaging with each other to fix themselves to each other.

Figure 1:
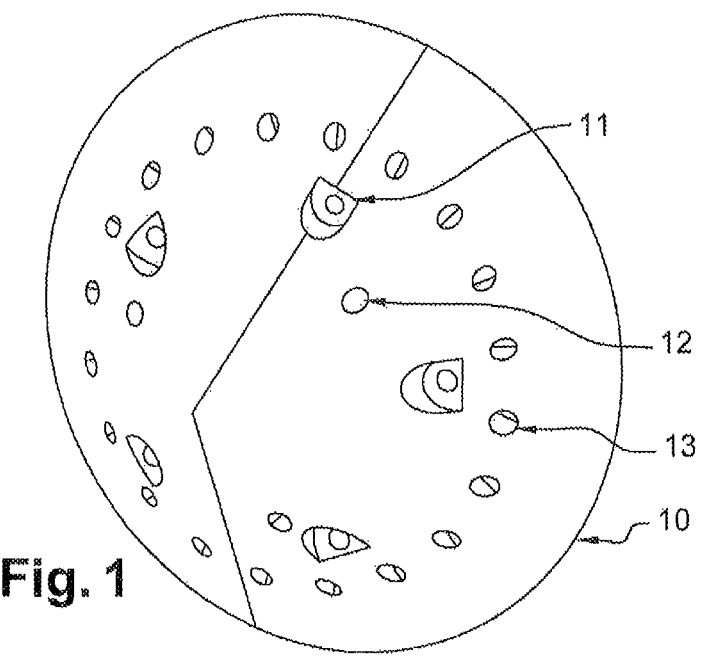
In FIG. 1 already described, a diagrammatic view of an intake cone according to prior art.
Figure 2:
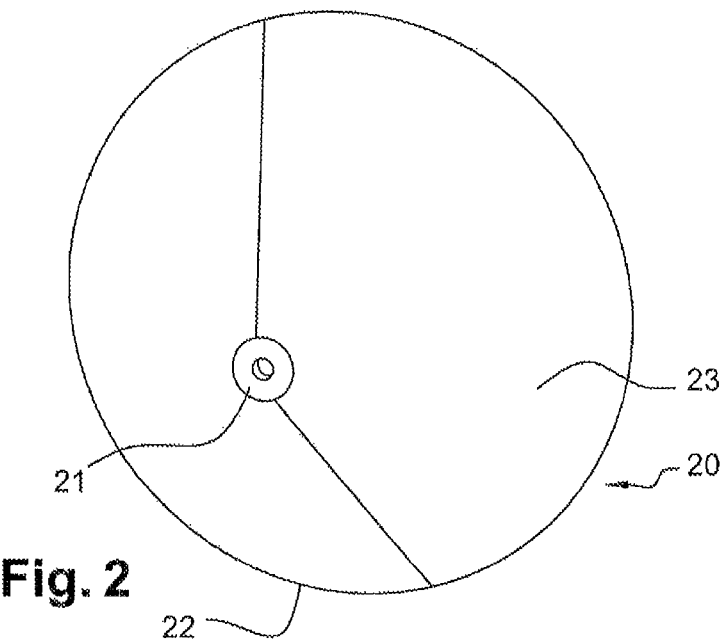
In FIG. 2, a diagrammatic view of a cowl according to one embodiment of the invention, in an upstream view.
Figure 3:
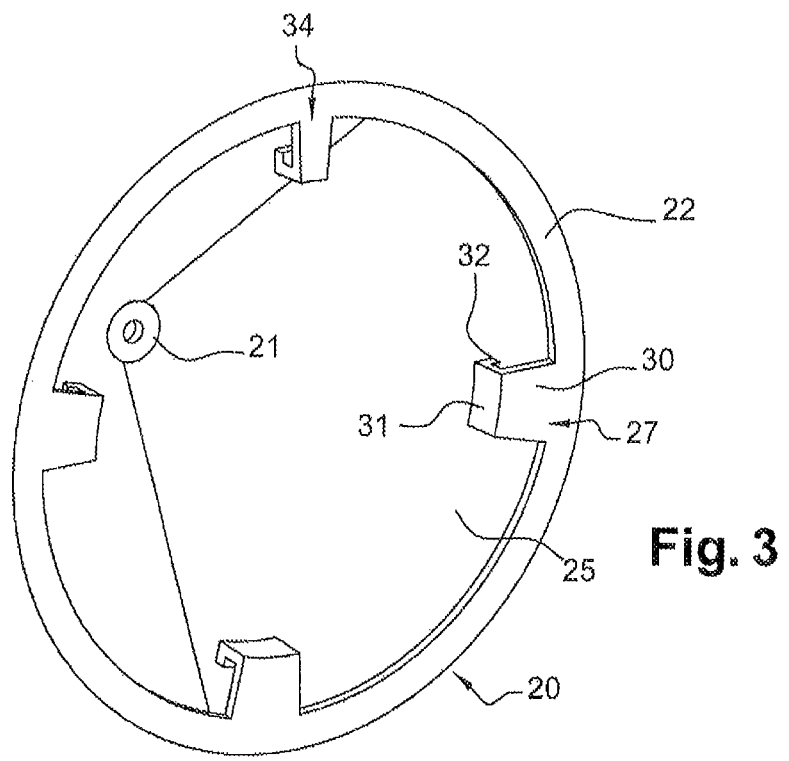
In FIG. 3, a diagrammatic view of the cowl in FIG. 2, in a downstream view.

FIGS. 2 and 3 diagrammatically show a cowl 20 according to one non-limitative embodiment of the invention. FIG. 2 shows an upstream view of the cowl 20, while FIG. 3 shows a downstream view of it. The terms "upstream" and "downstream" should be considered relative to a general direction of air flow on the cowl 20 when the cowl is mounted on the fan cone, air flowing along the direction from the upstream side to the downstream side. The cowl 20 has a globally conical shape, therefore air flows on the cowl 20 from its tip 21 towards its base 22.

As shown in FIG. 2, the cowl 20 has an approximately uniform outer surface 23, in other words an approximately smooth surface, in other words with no macroscopic geometric discontinuities. Thus, fluid flowing on the cowl 20 instead of flowing on the cone is not affected by any aerodynamic disturbance.

Figure 4:
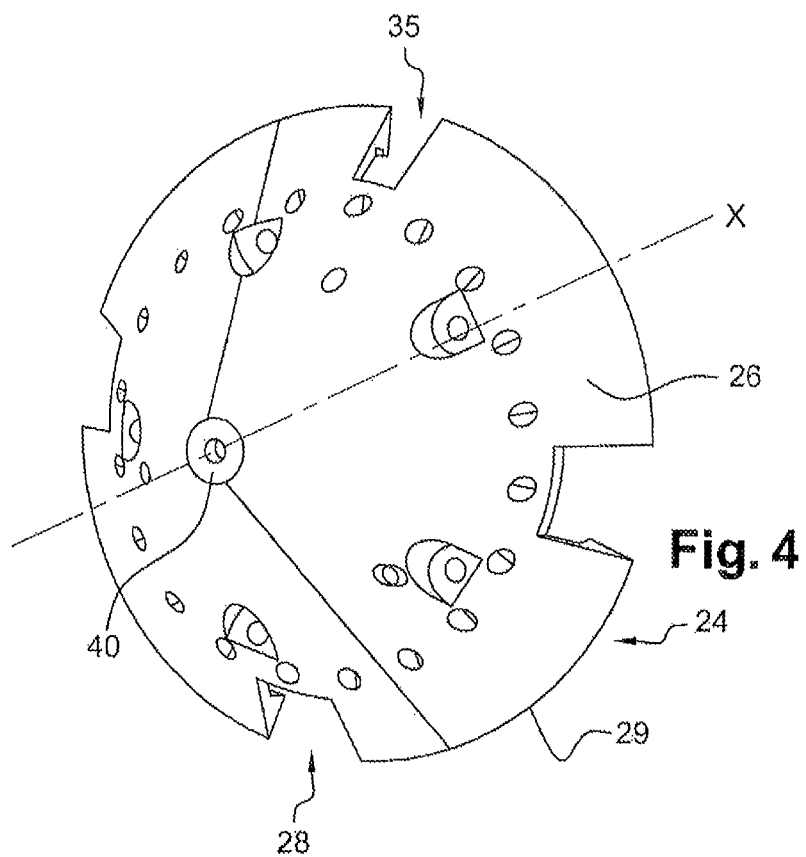
In FIG. 4, a diagrammatic view of a cone according to one embodiment of the invention, in an upstream view.
Figure 5:
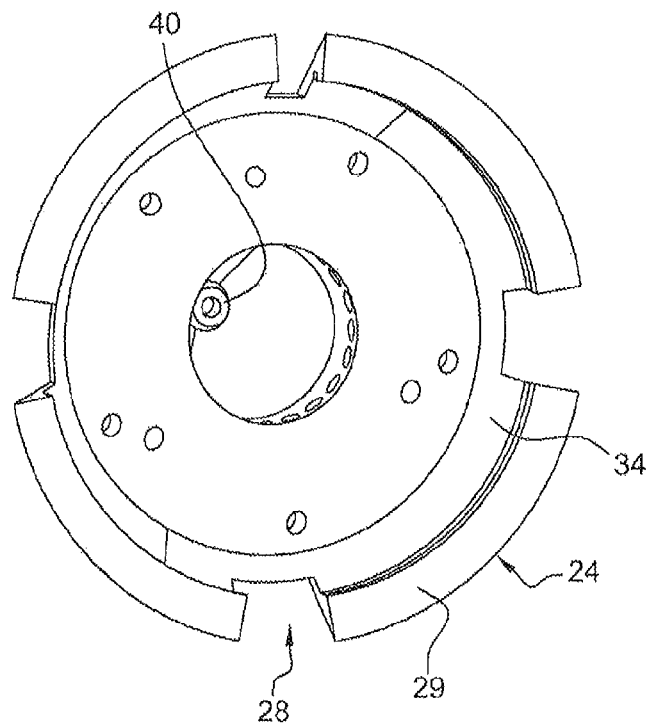
In FIG. 5, a diagrammatic view of the cone in FIG. 4, in a downstream view.

The cowl 20 is adapted so that it can be installed on a cone 24 shown diagrammatically in FIGS. 4 and 5. FIG. 4 shows an upstream view of the cowl 20, while FIG. 5 shows a downstream view of it. The inner surface 25 of the cowl 20 is complementary in shape to the outer surface 26 of the cone 24, which in particular limits the overall size due to the cowl 20 mounted on the cone 24.

Figure 6:
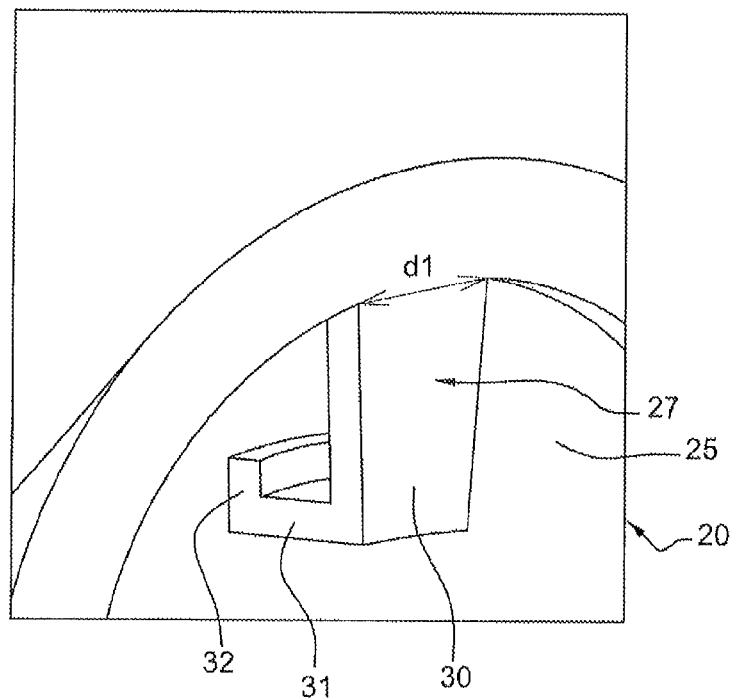
In FIG. 6, a diagrammatic view of a tooth of the cowl in FIG. 2.
Figure 7:
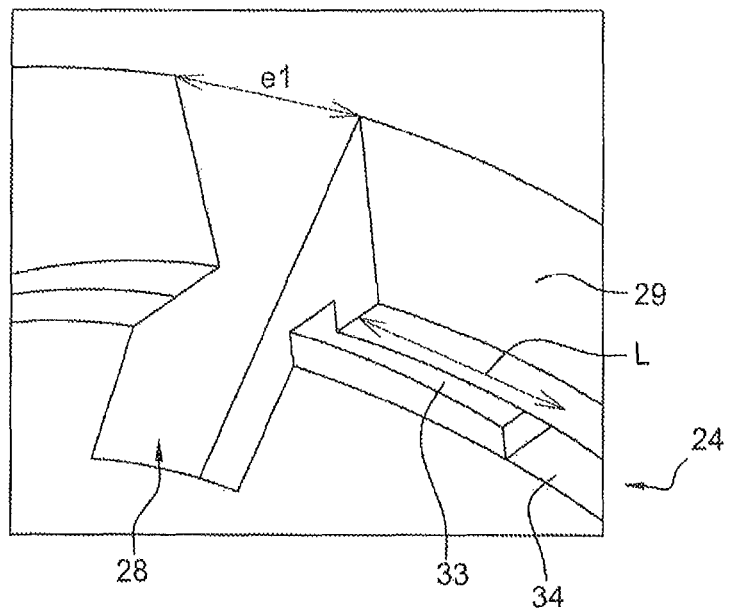
In FIG. 7, a diagrammatic view of a notch of the cone in FIG. 4.

The cowl 20 is provided with attachment means and the cone 24 comprises connection means, in order to keep the cowl 20 and the cone 24 fixed to each other in translation and in rotation, the attachment means and the connection means being adapted to engage with each other. As shown in FIG. 3, the attachment means comprise four teeth 27 originating from the inner surface 25 of the cowl 20 at the base 22 of the cowl 20 and extending inside the cowl 20. The inside of the cowl 20 refers to the volume delimited by the inner surface 25 and the base 22 of the cowl 20. The four teeth 27 will fit into the four notches 28 of the cone shown in FIGS. 4 and 5, said notches 28 being located at the base 29 of the cone 24. The notches 28 form part of the connection means. FIGS. 6 and 7 show only one tooth 27 and one notch 28, to facilitate understanding.

FIG. 6 diagrammatically shows one tooth 27 of the cowl 20. Said tooth 27 has a first part 30 extending in the base plane and originating from the inner surface 25 of the cowl 20. The width d1 of the tooth 27 refers to the dimension of the chord of the arc of a circle from which the first part 30 originates. The first tooth 27 also comprises an L-shaped return comprising a second part 31 and a projection 32. The second part 31 corresponds to the large bar of the L while the projection 32 corresponds to the small bar of the L. The second part 31 originates from the end of the first part 30 and extends orthogonal to the base plane 22 of the cowl 20 along the upstream direction. The projection 32 extends parallel to the first part 30 towards the inner surface 25 of the cowl 20.

FIG. 7 shows a notch 28 of the cone 24. Said notch 28 is an approximately rectangular opening passing through the wall of the cone 24 originating from the base 29 of the cone 24. The width e1 of the notch 28 refers to the dimension of the chord of the arc of a circle from which the notch 28 originates. The connection means of the cone 24 also comprise four grooves 33, each being located at a notch 28. A groove associated with the notch 28 described above is shown in FIG. 7. The groove 33 is formed by removing material from the inner surface 34 of the cone 24 extending parallel to the base plane over a length L and opening up in the notch 28. The grooves 33 extend either all to the right of the notches 28 or all to the left of the notches 28.

Each tooth 27 is associated with a notch 28 into which it will be engaged. In the embodiment described, three notches 28 have the same width e1 which corresponds to the width d1 of the three teeth 27, and the fourth notch 35 is narrower, also corresponding to the width of the fourth tooth 34. The notches 28 and the teeth 27 with the same width are associated with each other. The fourth tooth 34 and the fourth notch 35 act as fool proofing devices so that there can be no ambiguity about the correspondence between notches 28/teeth 27 and there is only one possible position of the cowl 20 on the cone 24. This prevents balancing of the cone 24 being lost after assembly or disassembly of the cowl 20.

Figure 8:
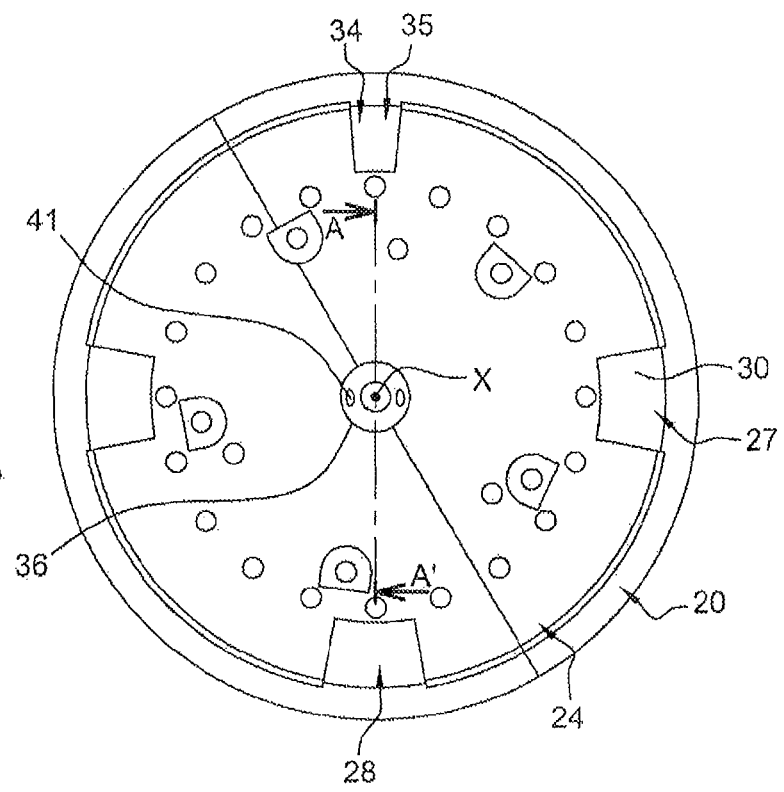
In FIG. 8, a diagrammatic view of an assembly comprising the cowl in FIG. 2 and the cone in FIG. 4, said cowl covering said cone, in a transparent upstream view.
Figure 9:
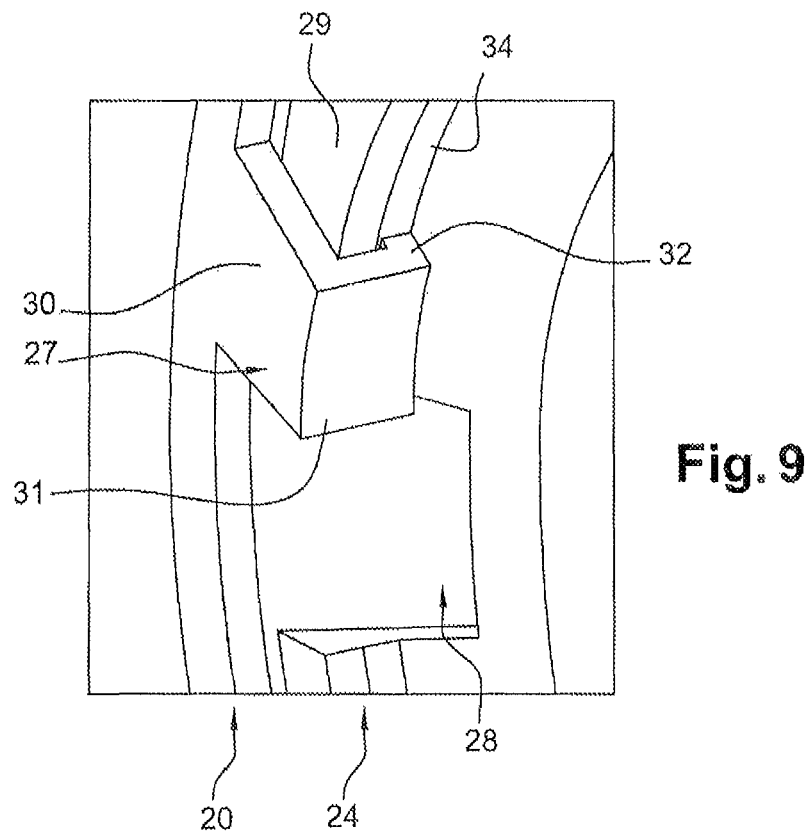
In FIG. 9, a diagrammatic view of the tooth in FIG. 6 engaging with the notch in FIG. 7.

The cowl 20 is mounted on the cone 24 as follows:

the cowl 20 is translated along the axial direction along the axis of revolution X of the cone 24 from the upstream side to the downstream side so to as to cover the outer surface 26 of the cone 24. Each tooth 27 then fits into the notch 28 associated with it. Note that there is no ambiguity about the correspondence between notches 28/teeth due to the fool proofing notch 35 and the fool proofing tooth 34. The translation is made until the inner surface 25 of the cowl 20 is supported on the outer surface 26 of the cone 24. This situation is shown in FIG. 8 that is a transparent upstream view showing the cowl 20 covering the cone 24, which means that the parts of the cowl 20 superposed on the cone 24 are shown as being transparent. It can be seen that the first parts 30 of the teeth 27 are engaged into the notches 28.

once the translation is complete, the cowl 20 is rotated to make the projection 32 of each tooth 27 slide in a groove 33. This blocks the cowl 20 in translation along the axis of revolution X and prevents it from separating from the cone 24. Note that advantageously, the grooves 33 all extend over the cone along a direction identical to the direction of rotation of the cone 24 when it is operating. Thus, rotation of the cowl 20 takes place in a direction opposite the rotation direction. This prevents the cowl 20 from becoming separated from the cone 24 during operation under the effect of the centrifugal force. FIG. 9 diagrammatically shows a tooth 27, a projection 32 of which is housed in a groove 33. Advantageously, the length L of the groove 33 is such that the cowl 20 can be rotated by an angle equal to between five and thirty degrees during the rotation step. This angle assures that the cowl 20 is sufficiently robust under assembly and disassembly operations and can limit machining operations on the cone 24. However, this angle range is given only for guidance and rotation of the cowl 20 by a significantly larger angle is possible.

Figure 10:
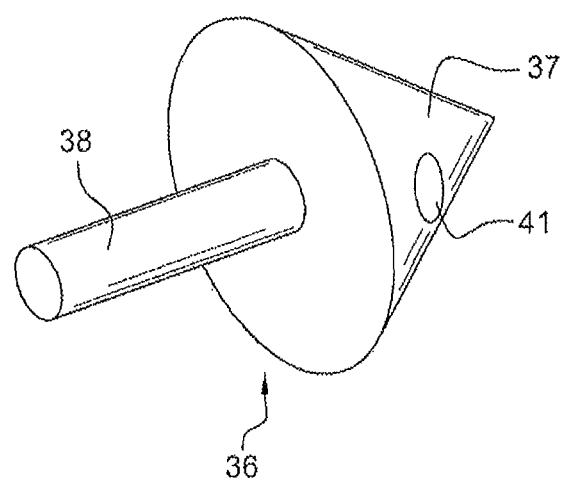
In FIG. 10, a diagrammatic view of a retaining screw of the cowl in FIG. 2 on the cone in FIG. 4.
Figure 11:
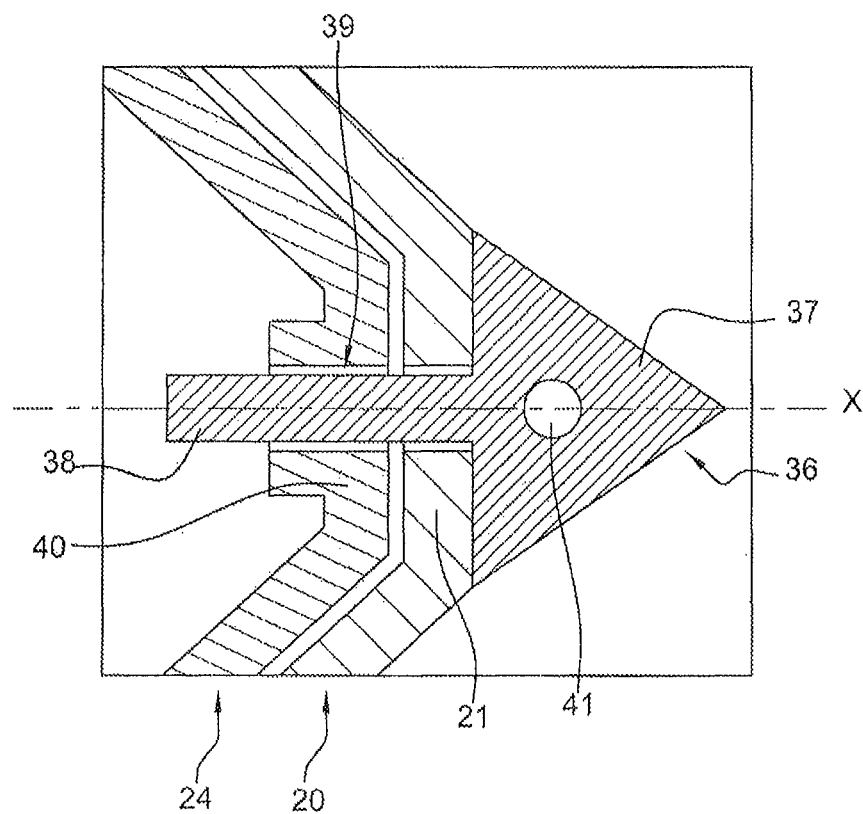
In FIG. 11, a diagrammatic view of the assembly comprising the cowl in FIG. 2, the cone in FIG. 4 and the screw in FIG. 10.
Figure 12:
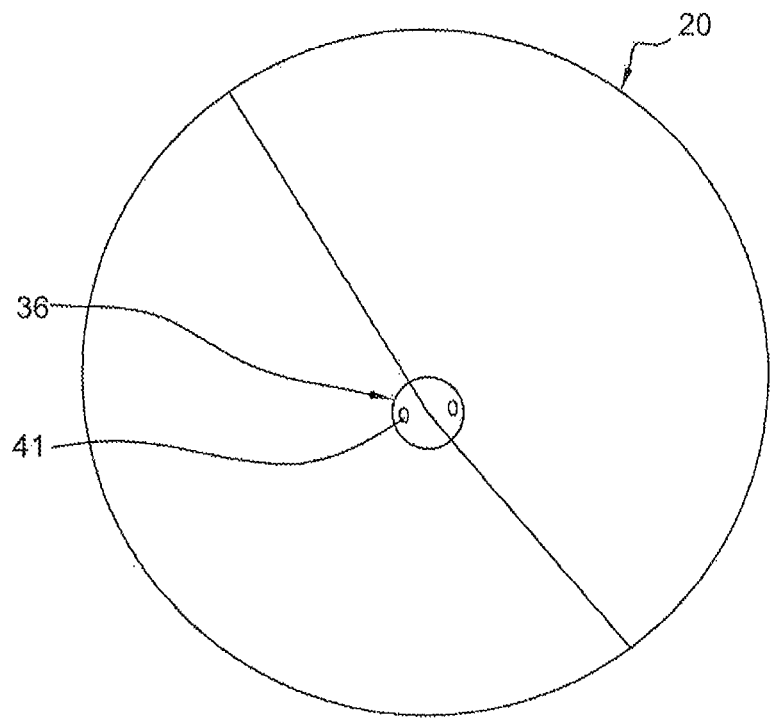
In FIG. 12, a diagrammatic view of the cowl in FIG. 2 covering the cone in FIG. 4, in an upstream view.

The attachment means also comprise a screw 36 that is diagrammatically shown in FIG. 10. The screw 36 comprises a tip 37 conical in shape and a stem 38. Furthermore, the connection means comprise a crimped nut 39 installed at the tip 40 of the cone 24. The stem 38 of the screw 36 is designed to be screwed in the crimped nut 39 to help retaining the cowl 20 on the cone 24 after the rotation step, as shown in FIG. 11. The tip 37 of the screw 36 comprises a through hole 41 through which a tool can pass to tighten the screw 36 onto the nut 39, or to loosen it when it is required to remove the cowl 20. Note that since it is positioned at the tip 21 of the cowl 20, the tip 37 of the screw 36 is conical in shape to avoid disturbing the aerodynamic flow of the fluid on the cowl 20. The cowl 20 mounted on the cone 24 after assembly, in other words after the translation, rotation and insertion steps of the screw 36, is shown in FIG. 12. Note that there are now only two holes visible to the air flow at the cone 24; the holes 41 necessary to position the screw 36 on the crimped nut 39. Therefore, the cowl 20 reduces flow disturbances and enables an aerodynamic gain.

Figure 13:
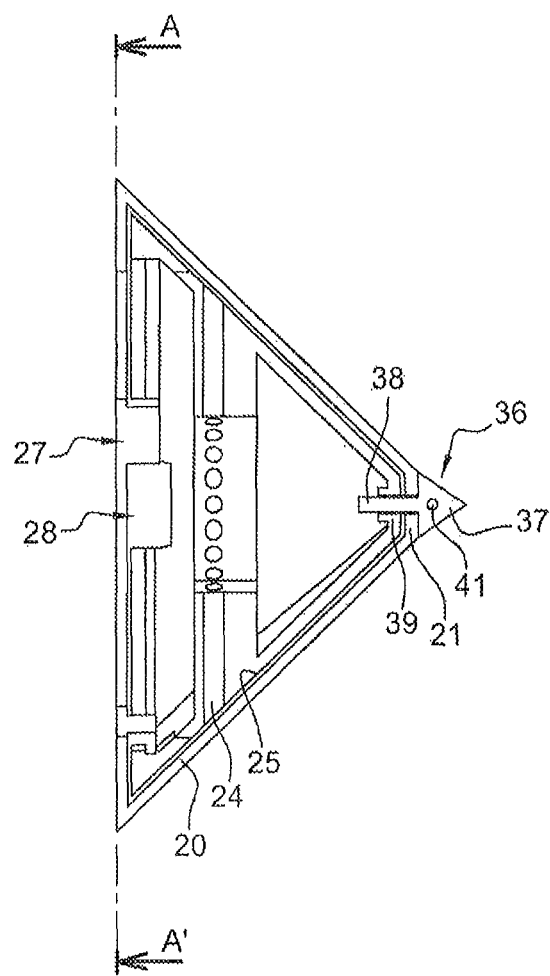
In FIG. 13, a diagrammatic view of the cowl in FIG. 2 covering the cone in FIG. 4, in a sectional view.
Figure 14:
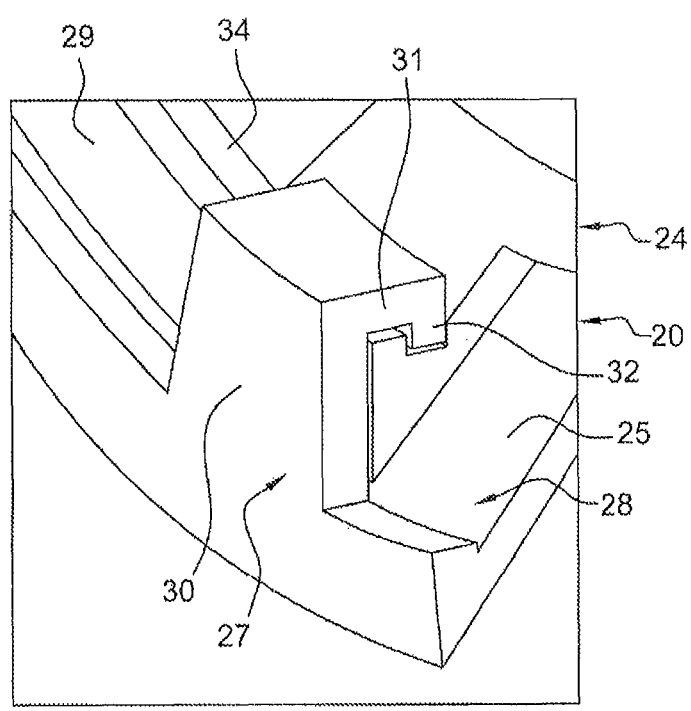
In FIG. 14, a part of FIG. 13 in a perspective view.

FIG. 13 shows a sectional view of the cowl 20 installed on the cone 24 along a sectional plane AA' shown in FIG. 8. The lower part of this figure is shown enlarged and in three dimensions in FIG. 14, to facilitate understanding.

Note that the impact of the cowl 20 on the surrounding parts is minimum, because the cowl 20 matches the shape of the cone 24. It is also easy to assemble or disassemble the cowl 20. Furthermore, the cowl 20 and its retention in position on the cone 24 resist centrifugal forces originating from rotation of the cone 24. Finally, the cowl 20 does not affect the balancing function provided by the cone 24 due to the fool proofing tooth 34 and the fool proofing notch 35.

The invention is not limited to the embodiment described and variants could be envisaged and particularly:

there are not necessarily four teeth 27 and four notches 28. Four teeth 27 give good retention and precise guidance of the cowl 20 on the cone 24 but three teeth 27 are sufficient. Note that retention of the cowl 20 is important due to risks of ingestion of birds. A larger number of teeth 27 is also feasible.

The width of the fool proofing tooth 34 and the fool proofing notch 35 may be larger than the width of the other teeth 27/notches 28.

The other teeth 27 may be different widths, however machining of the cowl 20 is simpler if the teeth 27 are all the same width. The same applies for the notches 28.

The invention claimed is:

1. A rotating turbine engine fan cone, comprising connection components configured to engage with attachment components of a cowl of a turbine engine adapted to cover said cone to keep said cone and said cowl secured to each other, the attachment components including teeth, the connection components comprising:

a plurality of notches arranged at a base of the cone, said notches being adapted to house the teeth of the cowl, and;

a plurality of grooves opening up in the notches, and adapted to house projecting parts projecting from the teeth.

2. The rotating turbine engine fan cone according to claim 1, wherein the connection components include four of the notches.

3. The rotating turbine engine fan cone according to claim 1, wherein a width of one of the notches is not the same as the width of the other notches.

4. The rotating turbine engine fan cone according to claim 1, wherein the connection components comprise a crimped nut positioned at a tip of the cone.

5. An assembly comprising a rotating turbine engine fan cone according to claim 1, and a cowl of a turbine engine adapted to cover said cone, said cowl comprising attachment components configured to engage with the connection components of the cone to keep said cowl and said cone secured to each other, said attachment components comprising:

a plurality of teeth arranged at a base of the cowl, said teeth being adapted to be engaged in the notches of the cone;

a plurality of projecting parts projecting from teeth, and adapted to slide in the grooves of the cone opening up in the notches.

6. The assembly according to claim 5, wherein the cowl is provided with four teeth.

7. The assembly according to claim 5, wherein a width of one tooth is not the same as the width of the other teeth.

8. The assembly according to claim 5, wherein the attachment components comprise a screw configured to be screwed onto a crimped nut of the cone, said crimped nut being positioned at a tip of the cone.

9. The assembly according to claim 5, wherein the cowl has an approximately uniform outer surface.

10. The assembly according to claim 5, wherein an inner surface of the cowl is complementary to an outer surface of the cone.

* * * * *